(12) United States Patent  
Hara

(10) Patent No.: US 9,595,106 B2  
(45) Date of Patent: Mar. 14, 2017

(54) CALIBRATION APPARATUS, CALIBRATION METHOD, AND PROGRAM

(71) Applicant: Takayuki Hara, Kanagawa (JP)

(72) Inventor: Takayuki Hara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/940,225

(22) Filed: Nov. 13, 2015

(65) Prior Publication Data

US 2016/0140714 A1 May 19, 2016

(30) Foreign Application Priority Data

Nov. 19, 2014 (JP) ................................. 2014-235010

(51) Int. Cl.
*G06T 7/00* (2006.01)
*G06T 5/00* (2006.01)
*H04N 9/31* (2006.01)

(52) U.S. Cl.
CPC ............ *G06T 7/0018* (2013.01); *G06T 5/002* (2013.01); *G06T 7/004* (2013.01); *H04N 9/3185* (2013.01);
(Continued)

(58) Field of Classification Search
CPC ....... G06T 5/002; G06T 7/0018; G06T 7/004; G06T 2207/30244; H04N 9/3185; H04N 9/3194
See application file for complete search history.

(56) References Cited

U.S. PATENT DOCUMENTS 7,724,379 B2    5/2010  Kawasaki et al.
2008/0095468 A1*  4/2008  Klemmer ............ H04N 9/3194
                                                382/285
(Continued)

FOREIGN PATENT DOCUMENTS

JP    2001-320652    11/2001
JP    2005-326247    11/2005
(Continued)

OTHER PUBLICATIONS

Toru Takahashi et al., "An Experimental Study on Geometric Correction for Projected Images", The Society of Instrument and Control Engineers, Tohoku Branch, 235th research meeting, May 18, 2007, No. 235-5.
(Continued)

*Primary Examiner* — Edward Park
(74) *Attorney, Agent, or Firm* — IPUSA, PLLC

(57) ABSTRACT

A calibration apparatus calibrating a projection apparatus projecting a projection image includes a captured image acquiring unit acquiring a captured image at each change of at least one of a relative position between the projection apparatus and a plane body and a relative posture between the projection apparatus and the plane body, a reflection position estimating unit acquiring reflection positions at each change of at least one of a position of the plane body and a posture of the plane body using a predetermined correspondence relationship between a pixel of the captured image and a position on the plane body, a plane body position posture estimating unit estimating positions and postures of the plane body so as to minimize a degree of misfit of the reflection positions from a straight line of the reflection positions, and a projection light beam identifying unit identifying an equation of the light beam.

9 Claims, 14 Drawing Sheets

(52) U.S. Cl.
CPC . *H04N 9/3194* (2013.01); *G06T 2207/30244* (2013.01)

(56) References Cited

U.S. PATENT DOCUMENTS

| | | | |
|---|---|---|---|
| 2014/0132759 A1* | 5/2014 | Itoh | G01C 15/00 348/135 |
| 2014/0267624 A1 | 9/2014 | Hara | |
| 2014/0347526 A1 | 11/2014 | Hara et al. | |
| 2015/0043827 A1 | 2/2015 | Hara | |
| 2015/0319415 A1 | 11/2015 | Hara | |
| 2016/0044301 A1* | 2/2016 | Jovanovich | G01S 17/89 348/50 |

FOREIGN PATENT DOCUMENTS

| | | |
|---|---|---|
| JP | 4230525 | 2/2009 |
| JP | 2012-078858 | 4/2012 |
| JP | 2014-131091 | 7/2014 |
| JP | 2015-036629 | 2/2015 |
| WO | 2014/104383 | 7/2014 |

OTHER PUBLICATIONS

Zhengyou Zhang, "A Flexible New Technique for Camera Calibration", IEEE Transactions on Pattern Analysis and Machine Intelligence, vol. 22, No. 11, Nov. 2000, pp. 1330-1334.

\* cited by examiner

FIG.10
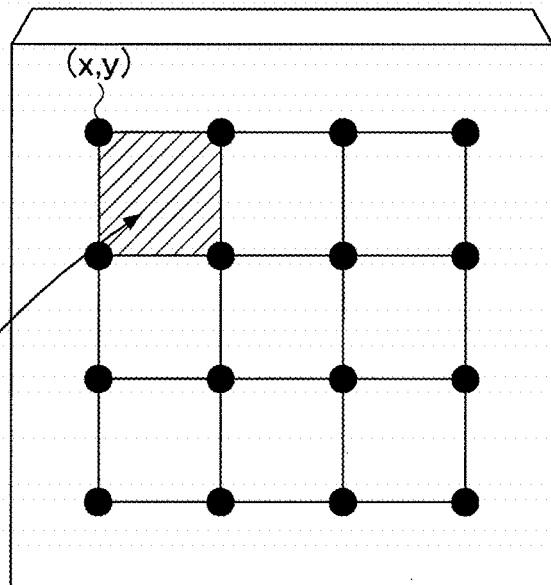
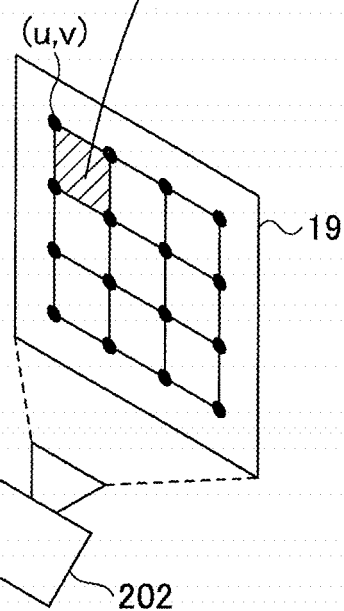

FIG.12
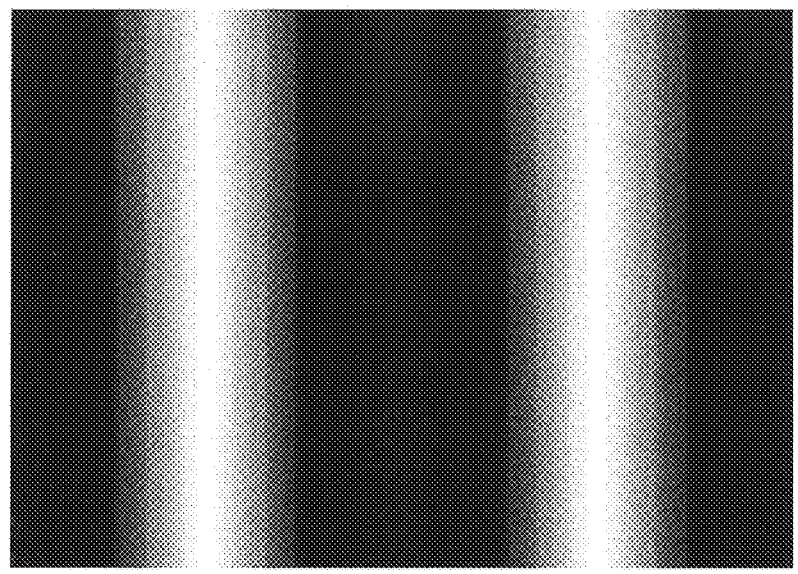
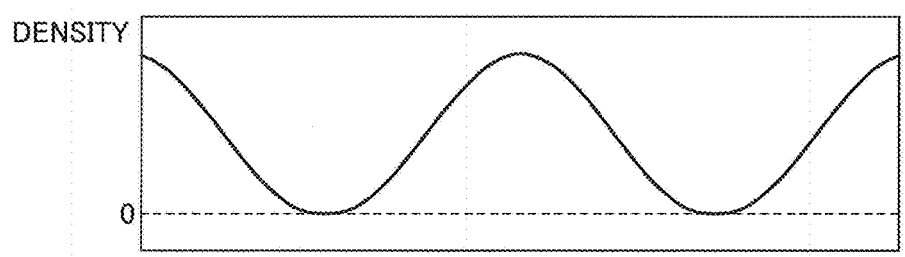

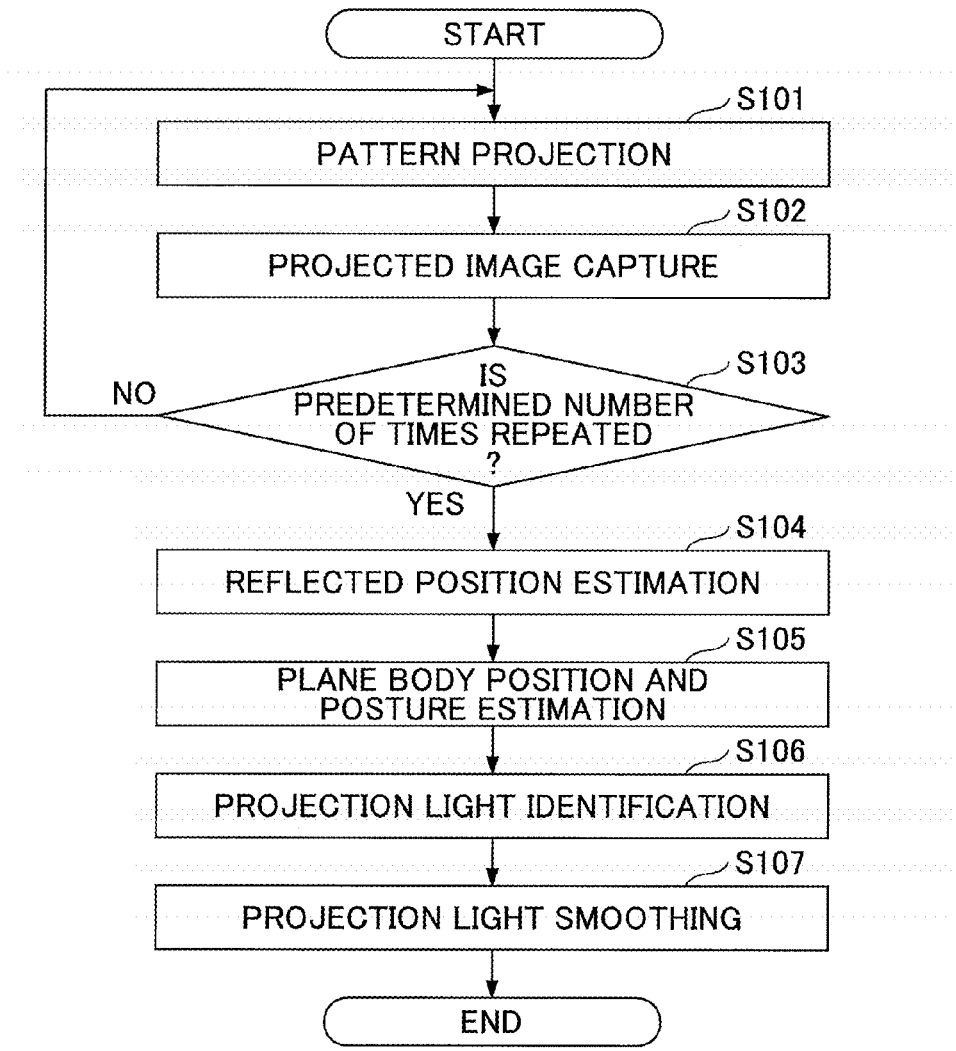

CALIBRATION APPARATUS, CALIBRATION METHOD, AND PROGRAM

BACKGROUND OF THE INVENTION

1. Field of the Invention

The present invention relates to a calibration apparatus, a calibration method, and a program.

2. Description of the Related Art

An image projected by a projection apparatus such as a projector is distorted depending on a position or a geometry of a projection surface. Therefore, there is a technique of correcting the distortion. As this technique, a projected image is captured by a camera, a two-dimensional correspondence relationship between an image (hereinafter referred to as a projector image) projected by the projection apparatus and an image (hereinafter referred to as a camera image) captured by the camera is acquired, and the projection apparatus, an information processing apparatus corrects, or the like corrects the projected image so that an image without distortion is projected. Meanwhile, there is a technique of performing a three-dimensional measurement of a projection target and correcting the projector image using acquired three-dimensional information. The latter technique has an advantage that a user watching the projected image is hardly confined from watching depending on a watching position.

A process of requiring a correspondence between a projector image and a camera image is frequently performed in order to do the three-dimensional measurement. Here, a pattern light projected to a projection target by the projection apparatus is captured by the camera. A characteristic point is arranged in the pattern light. When the information processing apparatus or the like specifies corresponding characteristic points on the projector image and on the camera image, the three-dimensional measurement of the projection target can be performed using the triangular survey.

In order to do the three-dimensional measurement using the triangular survey, it is necessary to acquire an internal parameter (a focal length, a light axis position, a distortion of the lens, and so on) of the projection apparatus and the optical system of the camera and an external parameter (a relative position, and a posture) of the projection apparatus and the camera. A calibration is acquiring the internal parameter and the external parameter. There are various calibration methods.

However, there is a case where a difficulty exists in applying these calibration methods to a part of projectors. The optical systems of the projectors are classified into a pinhole model where a projection light from the projector passes through a specific point and a non-pinhole model where a projection light from the projector does not pass through a specific point. Because many of the above calibration methods are based on the pinhole model, it may be inappropriate to apply a calibration technique for the pinhole model to the projector having the optical system of the non-pinhole model misfitting the pinhole model.

Then, there is a calibration method applicable to projectors having an optical system of the non-pinhole model (for example, Patent Document 1). Patent Document 1 discloses a calibration apparatus configured such that the position of the projection target and the posture of the projection target are estimated based on the camera image, the reflection position at which a light beam projected by the projector reflects is estimated, and the direction of the light beam is identified based on the reflection position.

Patent Document 1: Japanese Laid-Open Patent Publication No. 2014-131091

SUMMARY OF THE INVENTION

It is a general object of at least one embodiment of the present invention to provide a calibration apparatus that substantially obviates one or more problems caused by the limitations and disadvantages of the related art.

One aspect of the embodiments of the present invention may be to provide a calibration apparatus for calibrating a projection apparatus projecting a projection image including a captured image acquiring unit configured to acquire a captured image which is generated by capturing a projection image by an image capturing unit at each change of at least one of a relative position between the projection apparatus and a plane body and a relative posture between the projection apparatus and the plane body, the projection image being projected onto the plan body, a reflection position estimating unit configured to acquire a plurality of reflection positions, at which a plurality of light beams are reflected on the plane body, at each change of at least one of a position of the plane body and a posture of the plane body using a predetermined correspondence relationship between a pixel of the captured image and a position on the plane body, a plane body position posture estimating unit configured to estimate a plurality of positions and postures of the plane body so as to minimize a degree of misfit of the plurality of reflection positions, at which one light beam is reflected on the plane body at each change of at least one of the position of the plane body and the posture of the plane body, from a straight line of the plurality of reflection positions, and a projection light beam identifying unit configured to identify an equation of the light beam by transforming the plurality of reflection positions of the light beam into a plurality of coordinates in a three-dimensional space using the position of and the posture of the plane body reflecting the one light beam and by causing the plurality of coordinates to approximate the straight line.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 10 illustrates an example of a pattern light projected on a plane body and a captured image.

FIG. 12 illustrates an exemplary pattern image.

FIG. 14 is a flowchart of an exemplary calibration method performed by a calibration apparatus (Fourth Embodiment).

FIG. 15 illustrates an exemplary linear filter.

DETAILED DESCRIPTION OF THE PREFERRED EMBODIMENTS

In the above-described calibration apparatus, there is a problem that an internal parameter is required to estimate the position of the projection target or the posture of the projection target.

A description is given below, with reference to the FIG. 1 through FIG. 15 of embodiments of the present invention. Where the same reference symbols are attached to the same parts, repeated description of the parts is omitted.

Reference symbols typically designate as follows:
11: plane body;
31: pattern image send unit;
32: memory unit;
33: captured image acquiring unit;
34: reflection position estimating unit;
35: plane body position and posture estimating unit;
36: projection light identifying unit;
37: projection light smoothing unit;
100: projector;
200: calibration apparatus; and
202: image capturing unit.

<Three-Dimensional Measurement of Projection Target>

At first, for convenience of description, a three-dimensional measurement in a projector of a pinhole model is described with reference to Non-Patent Document 1.

Non-Patent Document 1: TAKAHASHI Toru et al., "An Experimental Study on Geometric Correction for Projected Images", *The Society of Instrument and Control Engineers*, Tohoku Branch, 235-th research meeting, May 18, 2007, No. 235-5

Figure 1:
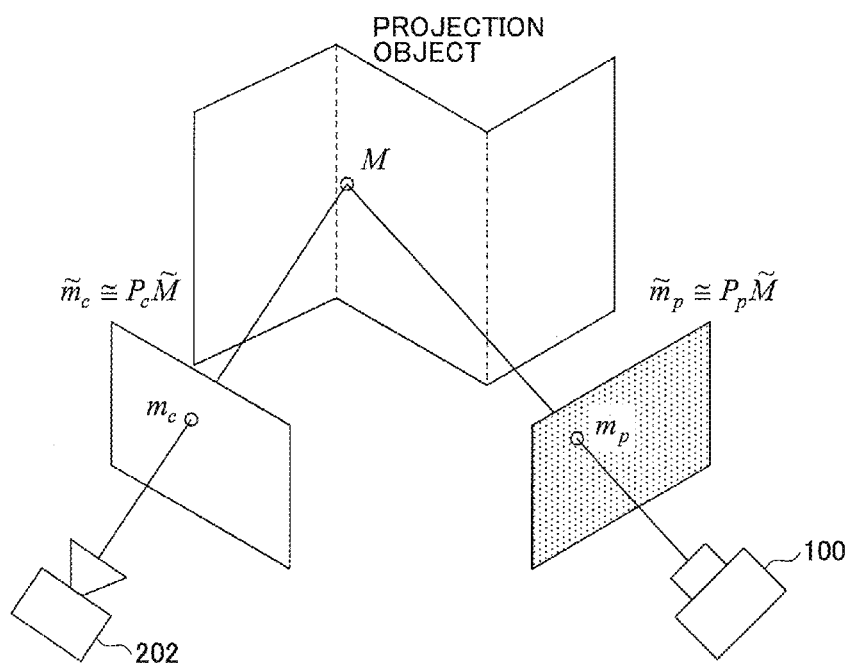
FIG. 1 illustrates an exemplary three-dimensional measurement of a projection target.

FIG. 1 illustrates a three-dimensional measurement of a projection target. When the image capturing unit 202 captures an image of a point M(X,Y,Z), a relationship between the coordinate (u,v) on the image corresponding the point M and the point M(X,Y,Z) is described as follows.

[Formula 1]

$$\begin{pmatrix} u \\ v \\ 1 \end{pmatrix} \cong P \begin{pmatrix} X \\ Y \\ Z \\ 1 \end{pmatrix}, \quad (1)$$

where P is a 3×4 matrix called a perspective projection matrix. The perspective projection matrix is expressed by an internal parameter A of the image capturing unit 202 and an external parameter (a rotation matrix R and a translation vector t) of the image capturing unit 202 as follows.

[Formula 2]

$$P = A[Rt] \quad (2)$$

This relationship consists for an optical system of the projector 100.

Therefore, provided that the perspective projection matrix of the projector 100 is designated by Pp, the perspective projection matrix of the image capturing unit is designated by Pc, the point on the three-dimensional space is designated by M (X,Y,Z), a point of a projector image (an image projected by the projector) corresponding to the point M is designated by mp (xp,yp), and a point of a camera image (a captured image) corresponding to the point M is designated by mc (xc,yc). For convenience of a matrix calculation, homogeneous coordinate expression is used.

[Formula 3]

$$\tilde{m}_p \cong P_p \tilde{M} \quad (3)$$

$$\tilde{m}_c \cong P_c \tilde{M} \quad (4)$$

Therefore, as illustrated in FIG. 1, if a correspondence (mp and mc reaching the point M) between the projector image and the camera image is obtained, Formula (3) and Formula (4) are used as simultaneous equations so as to obtain X, Y, and Z. The correspondence between the projector image and the camera image is obtainable by projecting a pattern light from the projector 100 and by causing a characteristic point of the projector image to associate with a characteristic point of the camera image.

In the projector 100 and the image capturing unit 202, in which the optical system of the pinhole model is adopted, the three-dimensional measurement becomes possible by obtaining the internal parameter and the external parameter. In the optical system of the pinhole model, it is known how to obtain the internal parameter and the external parameter.

On the contrary, in a non-pinhole model described below, a preferable way of obtaining the internal parameter and the external parameter is not ordinarily known. Within this embodiment, in the following non-pinhole model, a calibration is performed by obtaining an equation of a light beam projected from the projector 100 to a plane body without obtaining the internal parameter and the external parameter. If an equation of multiple light beams emit from the projector 100 is obtainable, Pp of Formula (3) of Formula 3 is obtainable. Therefore, X, Y, and Z are obtainable by making Formula (3) of Formula 3 simultaneous with Formula (4) of Formula 3. Therefore, the three-dimensional measurement becomes possible by acquiring the equation of the light beam.

<Optical System of Non-Pinhole Model>

Figure 2A:
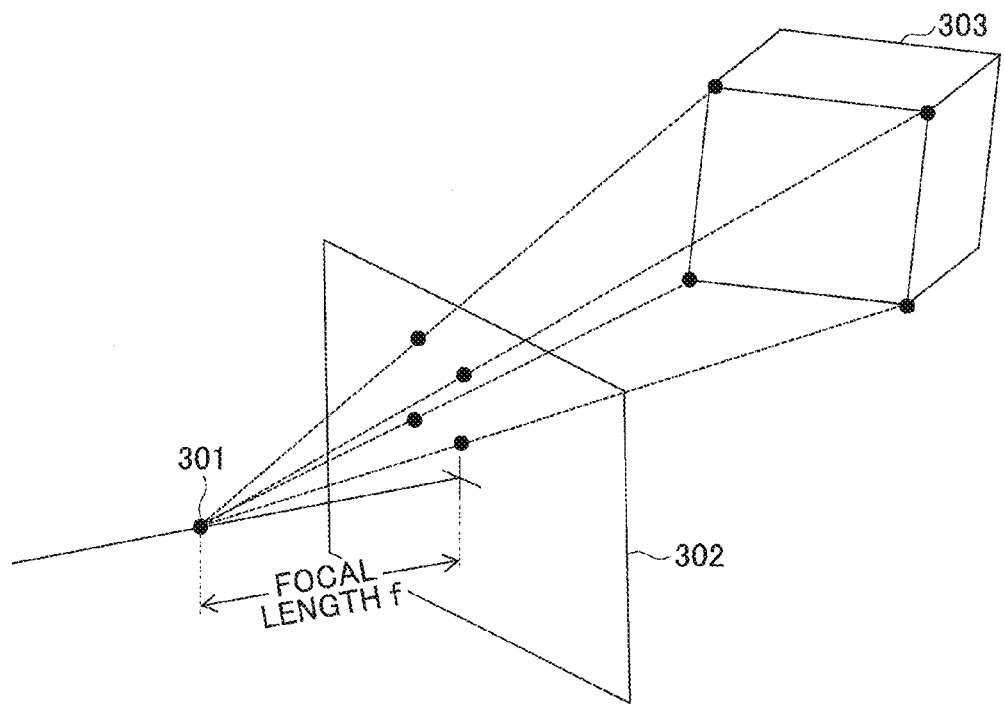
FIGS. 2A and 2B illustrate an exemplary optical system of a non-pinhole model.
Figure 2B:
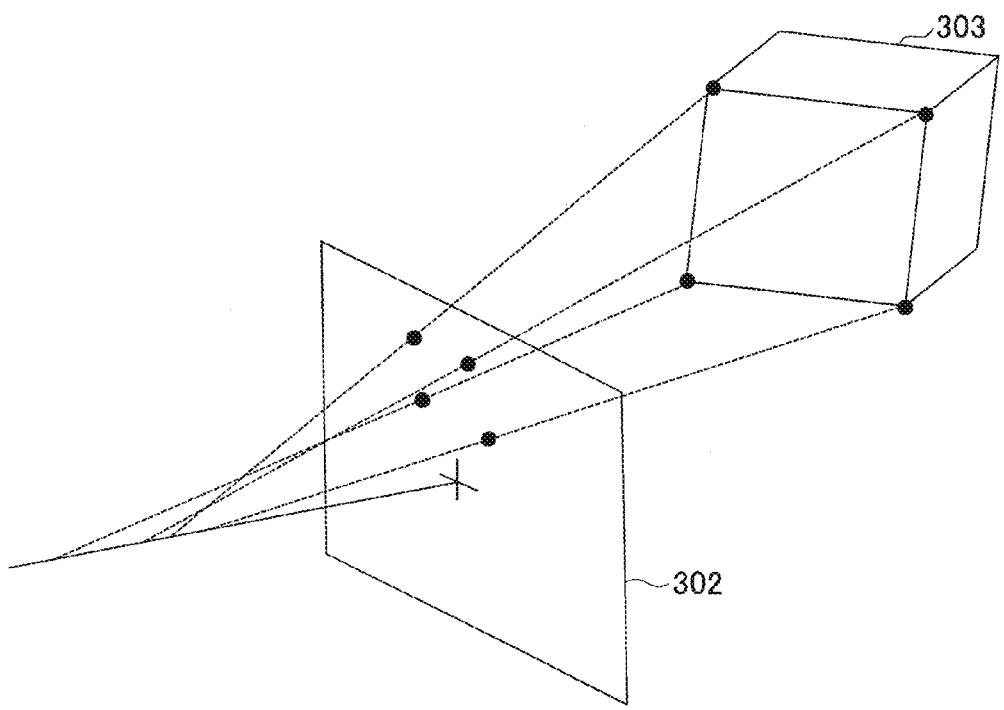

Referring to FIG. 2, the optical system of the non-pinhole model is described. FIG. 2A illustrates an optical system (a pinhole optical system) of the pinhole model. FIG. 2B illustrates an optical system (a non-pinhole optical system) misfitting the pinhole model. As illustrated in FIG. 2A, in the pinhole optical system, all light beams passing through the physical object 303 and the image plane 302 cross at one point (an observing point 301). On the contrary, in the non-pinhole optical system illustrated in FIG. 2B, light beams passing through the physical object 303 and the image plane 302 cross a t one point (the observing point). The optical system as illustrated in FIG. 2B is called the non-pinhole optical system as described above.

The calibration method of the embodiment is effective for the projector 100 of the non-pinhole optical system and the image capturing unit 202 of the non-pinhole optical system. However, the calibration method of the embodiment is applicable to the projector 100 of the pinhole optical system and the image capturing unit 202 of the pinhole optical system.

<Exemplary Structure of Projector and Camera System>

Figure 3:
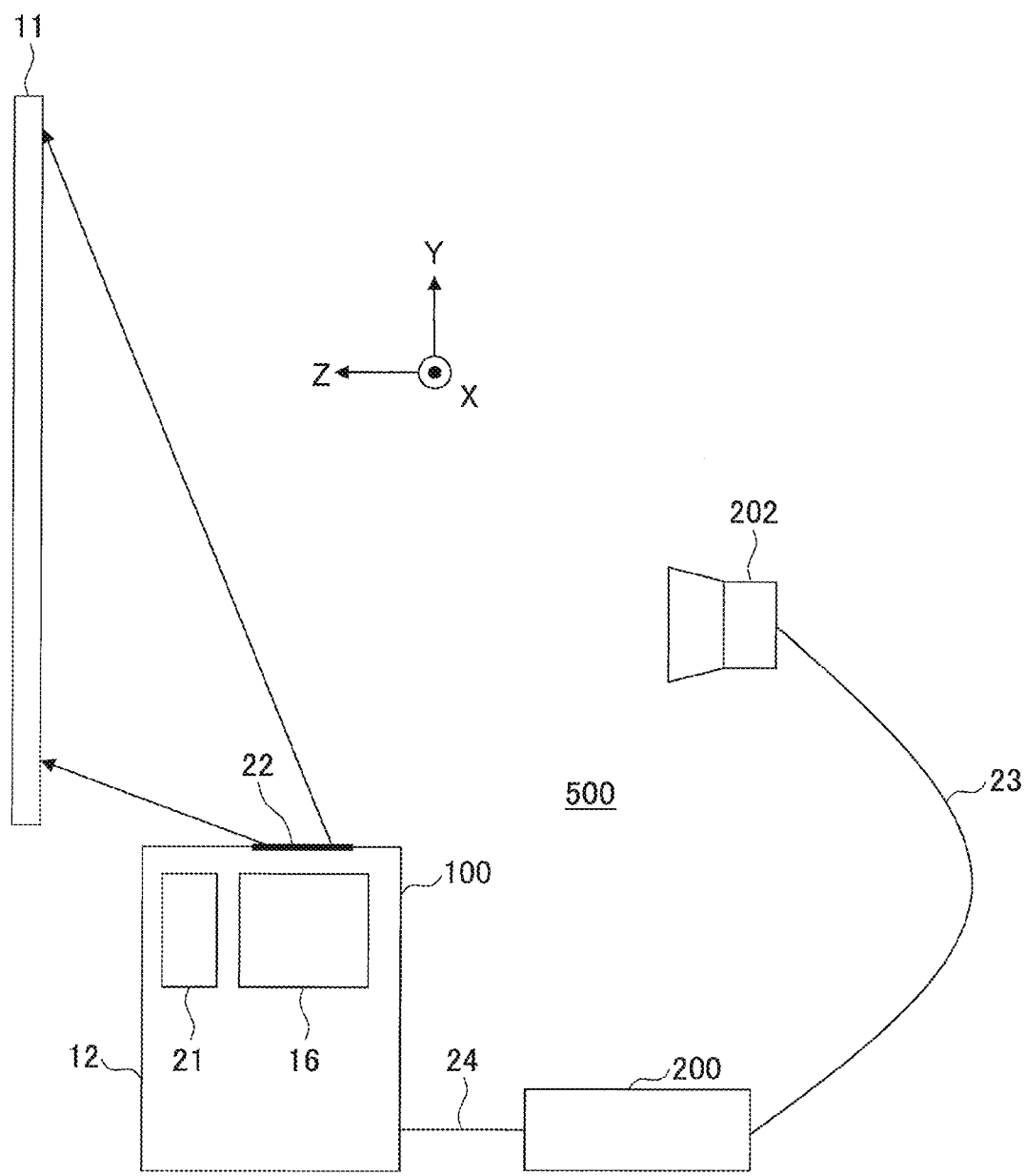
FIG. 3 is a side view of an exemplary projector and camera system.

FIG. 3 is a side view of an exemplary projector and camera system 500. Referring to FIG. 3, the projector and camera system 500 is described using an orthogonal coordinate system of the X-axis, the Y-axis, and the Z-axis. Said differently, the up and down directions of the plane body (e.g., a screen) 11 correspond to the Y-axis, directions vertical to the surface of the plane body 11 correspond to the Z-axis, and directions vertical to the paper face correspond to the Z-axis. For example, the projector 100 is arranged at a position obliquely downward the plane body 11 on the −Y side (a lower side) and on the −Z side (a right side) and close to the plane body 11. The projector 100 enabling such a close arrangement may be referred to as a short focus projector.

A calibration apparatus 200 is connected to the projector 100 through a cable 24. An image capturing unit 202 is connected to the calibration apparatus 200 through a cable 23. The image capturing unit 202 is an image capturing device including an image capturing element such as a CCD and a CMOS. The image capturing unit 202 is, for example, a digital still camera and a digital video camera. Instead, an image capturing function or the like of a device such as a smartphone, a tablet terminal, or a personal computer (PC) having another utilization purpose.

Figure 4:
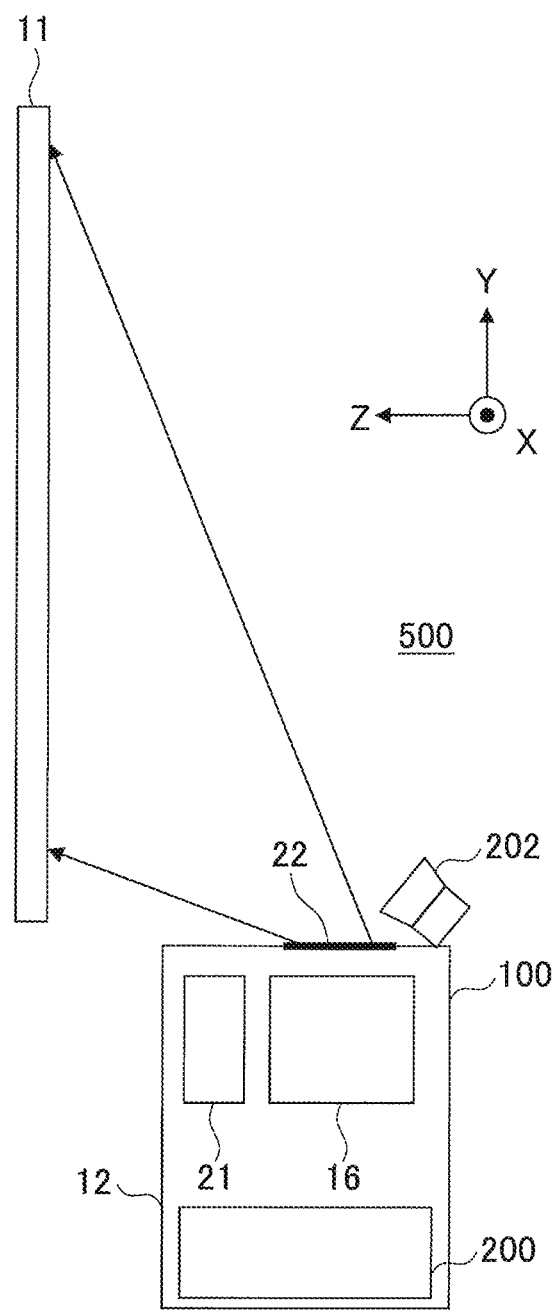
FIG. 4 is a side view of an exemplary projector and camera system.

The structure of FIG. 3 is only an example. Referring to FIG. 4, the calibration apparatus 20 and the image capturing unit 202 may be arranged inside the projector. FIG. 4 is a side view of another exemplary projector and camera system 500. In the projector 100 illustrated in FIG. 4, the calibration apparatus 200 and the image capturing unit 202 are arranged inside a casing 12. In the structure illustrated in FIG. 4, as an implementation where a function of the calibration apparatus 200 is included in the control device 21, the control device 21 may have the function of the calibration apparatus 200 while controlling the projector 100.

Referring back to FIG. 3, the description is given. As an example, the projector 100 includes a casing 12, a projection unit 16, and a control device 21 including, for example, a CPU 21. The casing 12 includes a box shape member in a substantially rectangular parallelepiped geometry and has a light transmission window 22 for transmitting a light in the upper surface of the casing.

The projection unit 16 is accommodated inside the casing 12, as an example. The projection unit 16 projects multiple light beams modulated in accordance with image information for projection onto the front surface (a screen surface) of the plane body 11. The image information for projection is sent from a PC connected by a cable through a cable or a network (a LAN, a WAN, or the like) or is read out of an external memory medium installed on an interface of the external memory medium.

<<Structure of Projection Unit>>

Figure 5:
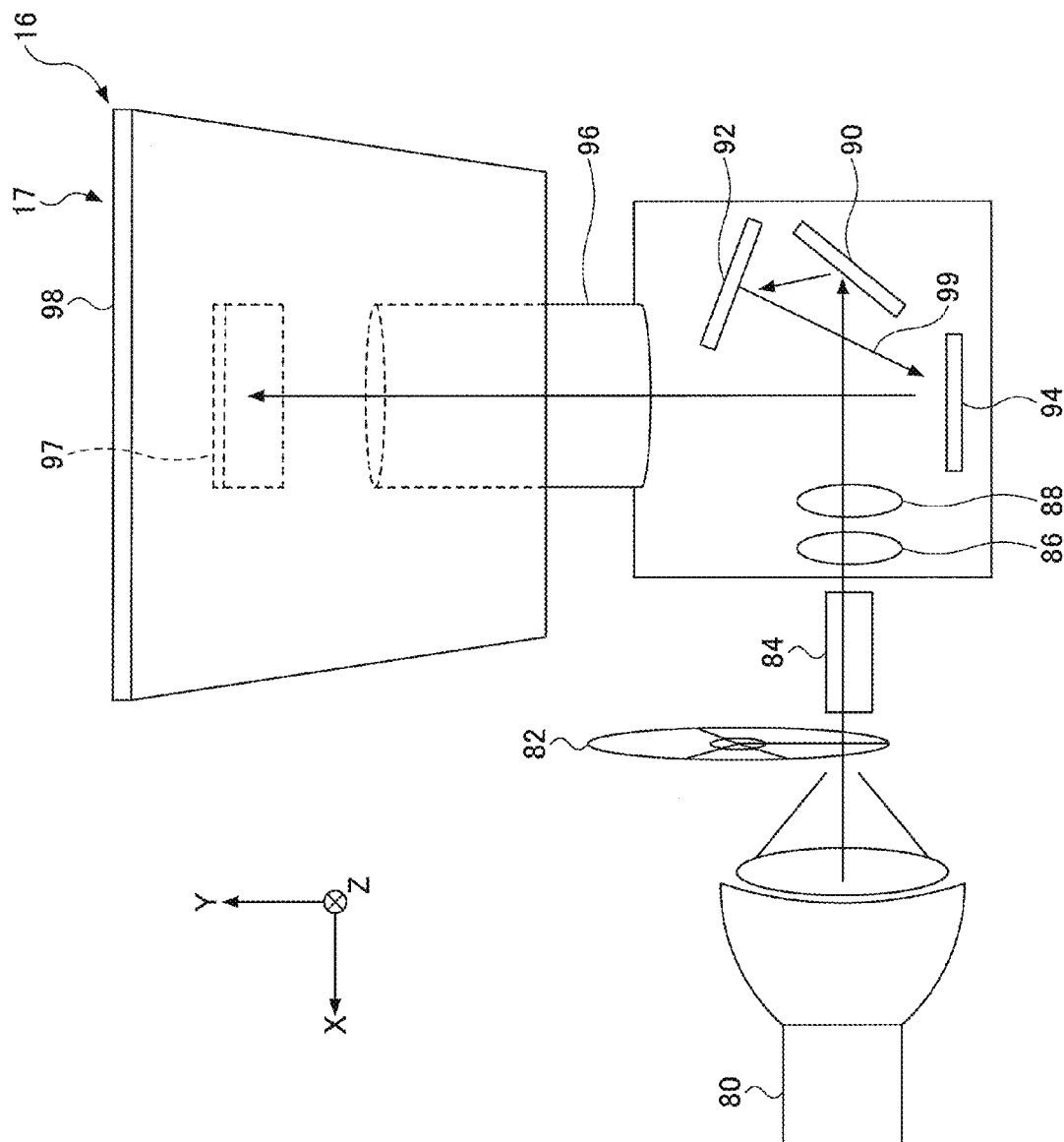
FIG. 5 illustrates an exemplary schematic structure of a projection unit.

FIG. 5 illustrates an exemplary schematic structure of the projection unit 16. The projection unit 16 includes a light source 80 and a projection optical system 17. The light source is, for example, a white light emitted by a high-brightness discharge lamp (a high-pressure mercury lamp, a high-pressure sodium lamp, a metal halide lamp, and so on) called a high intensity discharge lamp (HID) or a LED.

The projection optical system 17 includes, for example, a color wheel 82, a light tunnel 84, two condenser lens 86 and 88, two mirrors 90 and 92, a digital micro mirror device (DMD) 86, a projection lens 96, a mirror 97, and a free form mirror 98 as a light angle widening and reflecting means.

A white light emitted from the light source 80 is input into the color wheel 82. The light input into the color wheel 82 is separated into color lights three primary colors in time series and is taken out of the color wheel 82. The color lights taken out of the color wheel 82 are input into the light tunnel 84 so that a brightness distribution of each color light is homogenize and sequentially input into the condenser lens 86 and 88. An imaging plane is adjusted for each color light input into the condenser lenses 86 and 88. Thereafter, each light is sequentially reflected by the mirrors 90 and 92 and is input into the DMD 94. The color lights input into the DMD 94 is modulated in response to image information and reflected by the DMD 94 and sequentially input into the projection lens 96. After the light angle of each color light input into the projection lens 96 is widened, each color light is reflected so as to be reflexed by the mirror 97 and is sequentially input into the free form mirror 98. Each color light input into the free form mirror 98 is widened at their light angles and reflected, and is sequentially projected in an obliquely upward direction of +Y and +Z of the casing 12 through the light transmission window 22 toward the plane body 11.

As a result, a color image (a monochrome image depending on image information) is projected and displayed on the plane body 11. Referring to FIG. 5, an arrow 99 designates a light path from the light source 80 to the mirror 97.

The projection optical system 17 emits multiple light beams from multiple points which are mutually different and existing on the free form mirror 98. Said differently, the projection optical system 17 is a non-pinhole optical system, which is not the pinhole optical system where the multiple light beams are emitted from a specific point. Each light beam forming a pattern light emitted from the projection optical system 17 corresponds to one pixel, for example. This pixel is a pixel of the image which is projected by, for example, the projector 100. Instead, one micro mirror of the DMD 94 may be treated as a pixel.

The projection unit 16 is designed so that the focus position of the multiple light beams is close to the projection unit 16. Said differently, the projection unit 16 is structured to be a short focus. Therefore, the projector 100 is enabled to display a large color or monochrome image on the plane body 11 using a short projection distance. The above expression of "the projection unit 16 is structured to be the short focus" means that the optical system of the projection unit 16 includes a mirror having refractive power (e.g., the free form mirror 98). The refractive power of the mirror may be either positive or negative (said differently the mirror may be a concave mirror or a convex mirror). When the projection optical system 17 includes a mirror having refractive power, even if a distance from the light transmission window 22 to the plane body 11 is, for example, equal to or smaller than 50 cm, it is possible to display a projection image of about 80 inches.

In this projector 100 of the short focus type, the light can be projected from a position close to the plane body 11. Therefore, it is possible to prevent a human or an object from intervening between the projector 100 and the plane body 11 as much as possible and also to prevent the projection of the light to the plane body 11 from being blocked as much as possible.

The projector 100 of the short focus type may be of a liquid crystal form (a LCD form) or the like instead of the DMD 94. The projector 100 may be called a projection apparatus.

<<Hardware Structure of Calibration Apparatus>>

Figure 6:
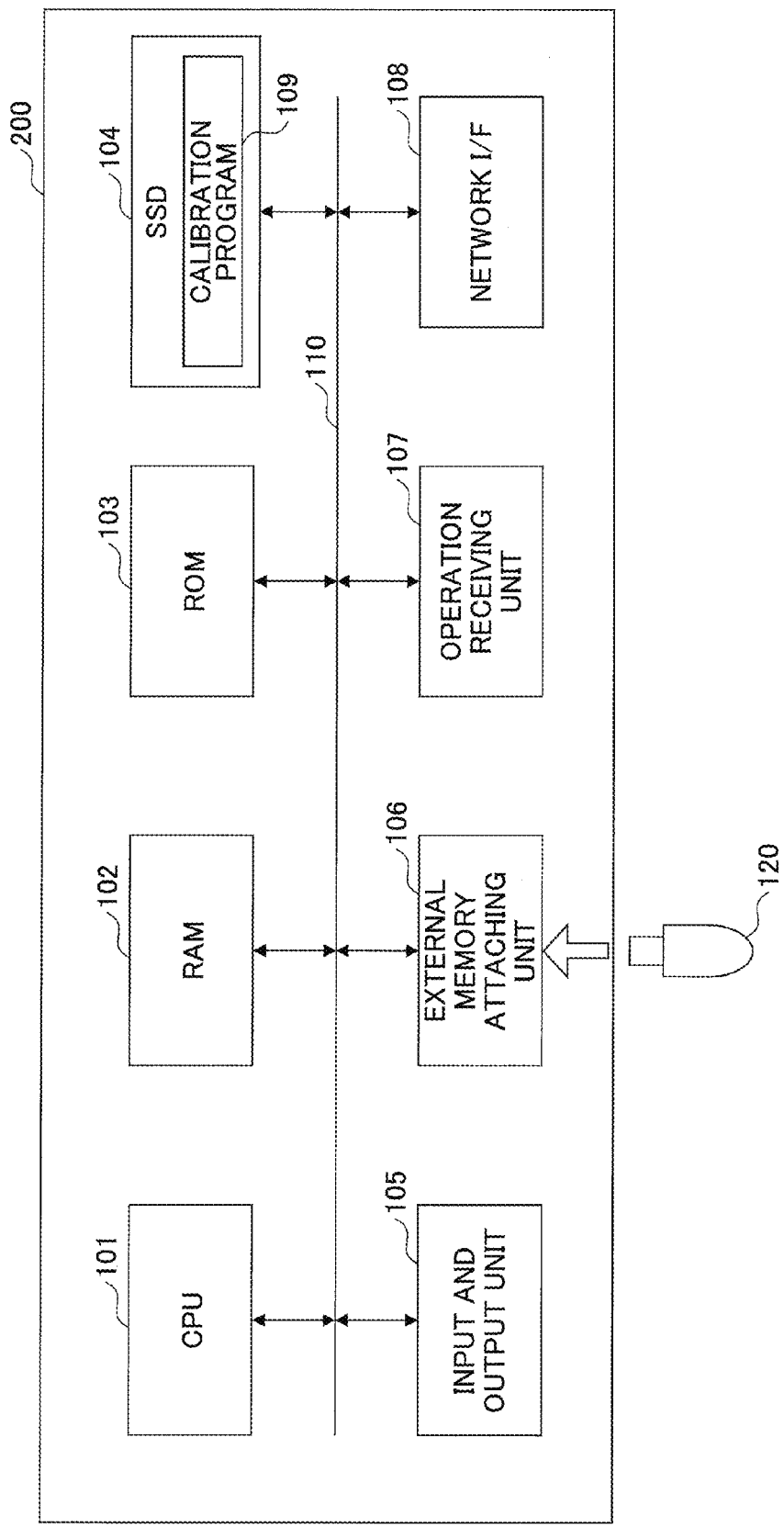
FIG. 6 illustrates a hardware structure of an exemplary calibration apparatus.

FIG. 6 illustrates a hardware structure of an exemplary calibration apparatus 200. The calibration apparatus 200 may be, for example, an information processing apparatus or a computer, and includes a CPU 101, a RAM 102, a ROM 103, a solid state drive (SSD) 104, an input and output unit 105, an external memory attaching unit 106, an operation receiving unit 107, and a network I/F 108, which are electrically connected through a bus line 110 such as an address bus or data bus.

The CPU 101 executes the calibration program 109 stored in the SSD 104 and controls an entire operation of the calibration apparatus 200. The RAM 102 is a working memory used by the CPU 101 in executing the calibration program 109. The ROM 103 stores a program (e.g., an initial program loader (IPL)) executed by the CPU 101 mainly at a time of starting up the calibration apparatus 200. The SSD 104 is a non-volatile memory storing the calibration program 109 and various data. A hard disk drive may be used instead of the SSD 104. The image capturing unit 202 or the projector 100 are connected to the input and output unit 105. Data or a control signal is sent to the image capturing unit 202 or the projector 100.

The external memory attaching unit 106 writes data into the external memory 120, which is attachable to or detachable from the external memory attaching unit 106, and reads the data from the external memory 120 in response to an instruction from the CPU 101. The external memory 120 is, for example, a USB memory, a flash memory such as an SD card, or an optical disk such as a CD-ROM. The operation receiving unit 107 is a hard key, a soft key, or the like, through which an operation to the calibration apparatus 200 is received. The operation receiving unit 107 may include a display such as a LCD or a display having a function of a touch panel. The network I/F 108 is an interface such as an Ethernet card ("Ethernet" is a registered trademark) provided to connect the network I/F 108 to the network.

First Embodiment

Hereinafter, referring to FIGS. 7 to 10, the calibration method of the first embodiment is described. Hereinafter, a subject of operations in deriving the formulas is a calibrating person, an applicant, or an inventor.

Figure 7:
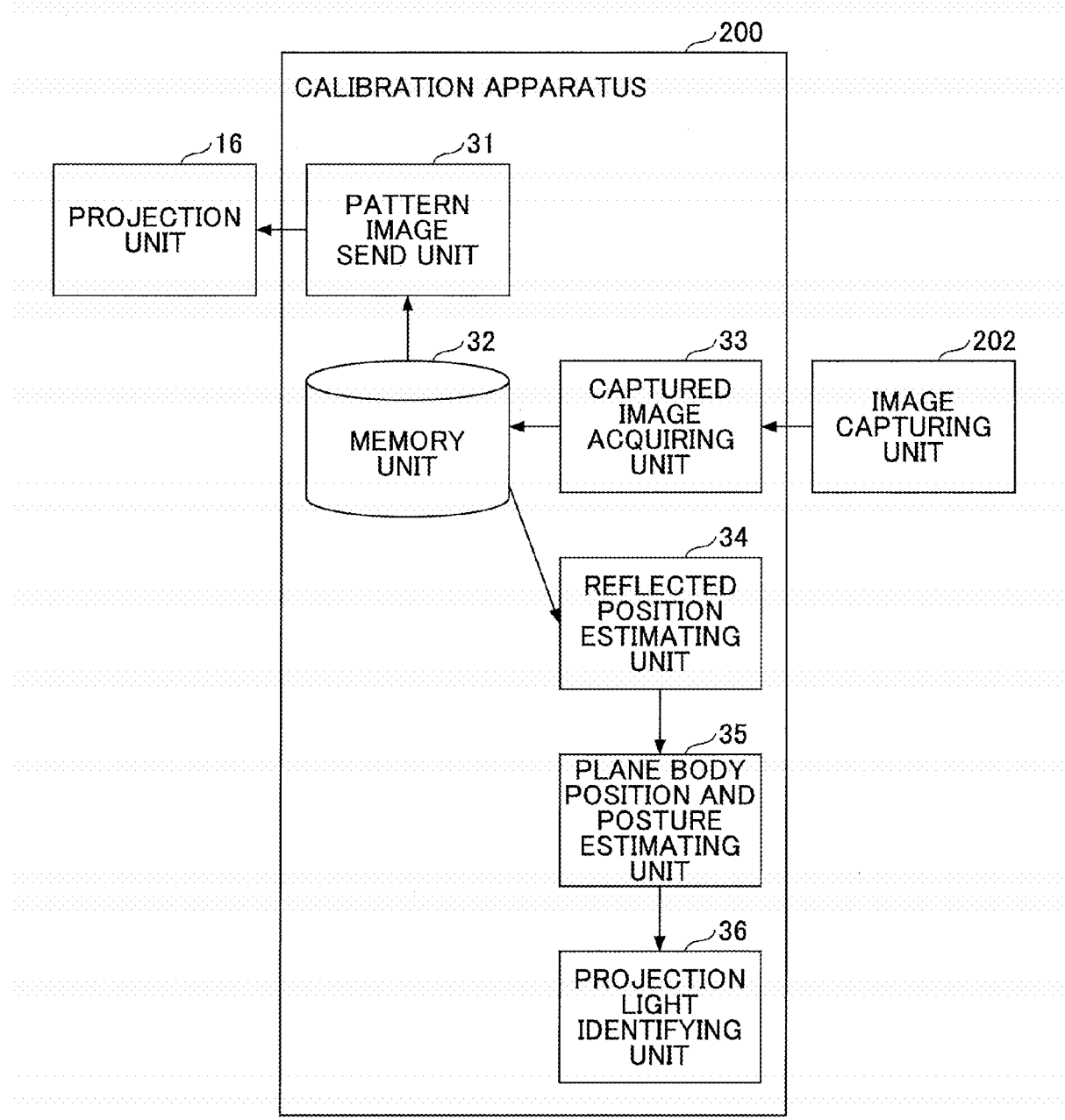
FIG. 7 is a functional block chart of an exemplary calibration apparatus.
Figure 8:
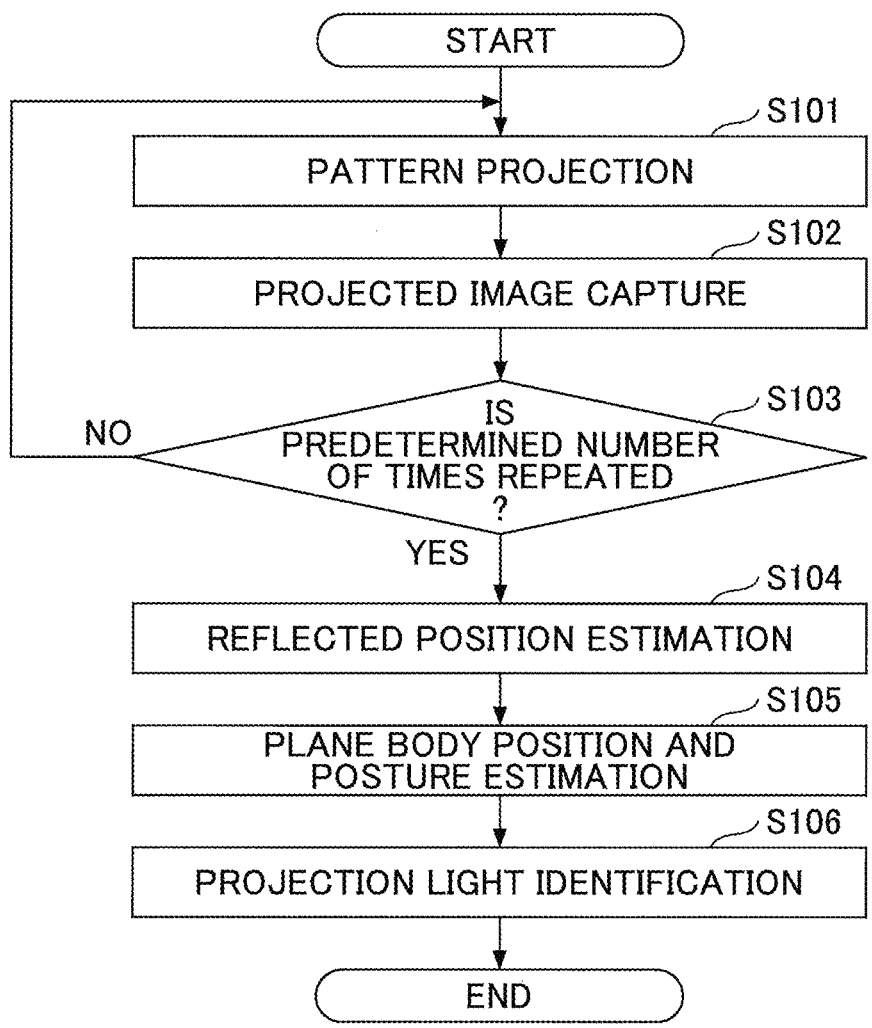
FIG. 8 is a flowchart of an exemplary calibration method performed by a calibration apparatus.

FIG. 7 is a functional block chart of the calibration apparatus 200 of the first embodiment as an example. FIG. 8 is a flowchart of an exemplary calibration method performed by the calibration apparatus 200. The first embodiment describes a calibration method wherein a calibrating person moves the projector 100 to calibrate the fixed plane body (a projection target) 11 and the fixed image capturing unit 202 in the projector and camera system 500 illustrated in FIG. 3.

Referring to FIG. 7, the calibration apparatus 200 includes a pattern image send unit 31, a memory unit 32, a captured image acquiring unit 33, a reflection position estimating unit 34, a plane body position and posture estimating unit 35, and a projection light identifying unit 36. The pattern image send unit 31, the captured image acquiring unit 33, the reflection position estimating unit 33, the plane body position and posture estimating unit 35, and the projection light identifying unit 36 are substantialized by the CPU 101 executing the calibration program 109 developed on the RAM 102.

The memory unit 32 is a volatile or non-volatile memory device formed by the RAM 102, the SSD 104, or the external memory 120, which are illustrated in FIG. 6. The memory unit 32 stores a pattern image projected as a pattern light on the plane body 11 at a time of calibrating the projection unit 16 (the projector 100).

Figure 9A:
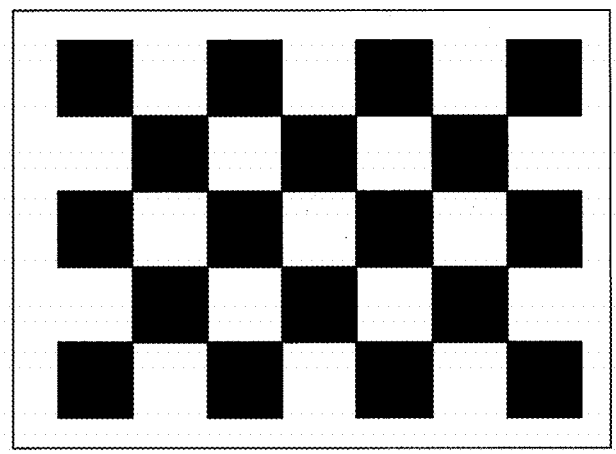
FIGS. 9A and 9B illustrate exemplary pattern images projected as pattern lights.
Figure 9B:
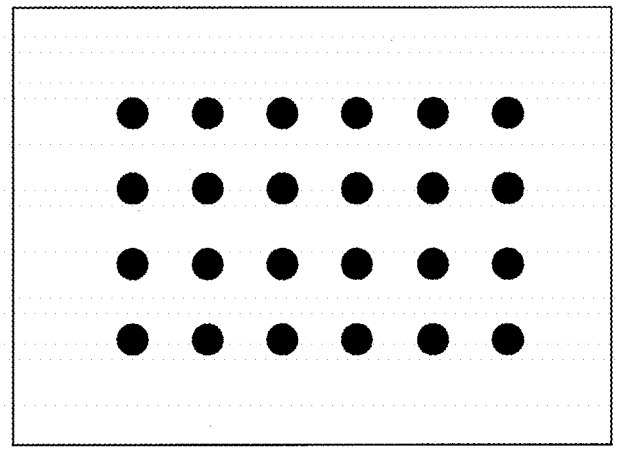

FIGS. 9A and 9B illustrate exemplary pattern images projected as pattern lights. The pattern light is, for example, a checker pattern formed by arranging a square lattice illustrated in FIG. 9A. The pattern light may be formed by dots arranged like a square lattice illustrated in FIG. 9B. In the pattern image illustrated in FIG. 9A, a corner of the lattice is a characteristic point. In the pattern image illustrated in FIG. 9B, the center of the dot is the characteristic point.

The pattern image is not limited to FIGS. 9A and 9B and may be replaced by a pattern image whose arrangement is known.

Referring back to FIG. 7, the description is given. The pattern image send unit 31 reads a pattern image stored in the memory unit 32 and sends the read pattern image to the projection unit 16. With this, the projection unit 16 can projects the pattern light onto the plane body 11. The image capturing unit 202 is secured to a range where the pattern light projected by the projection unit 16 to the plane body 11 may be captured.

The captured image acquiring unit 33 acquires the image (hereinafter, referred to as a captured image) of the pattern light captured by the image capturing unit 202 and causes the memory unit 32 to store the captured image. The image capturing unit 202 captures the pattern light projected onto the plane body 11 while changing the position and the posture of the projector 100 to some different positions and some different postures. Said differently, multiple captured images are generated. Here, at least one of the position or the posture may be changed in changing the position and the posture.

The reflection position estimating unit 34 estimates the reflection position p, at which the light beam of the pattern light projected on the plane body 11 is reflected on the plane body 11, using the captured images captured while the position and the position and the posture of the projector 100 are changed to the some different positions and the some different postures.

The plane body position and posture estimating unit 35 estimates a position (hereinafter, referred to as a relative position) of the plane body 11 relative to the projector 100 and a posture (hereinafter, referred to as a relative posture) of the plane body 11 relative to the projector 100 using the reflection position p. Said differently, a rotation matrix Ri and a translation vector ti of the plane body 11 relative to the projector 100 are acquired in the some positions and postures.

The projection light identifying unit 36 identifies the light beam to be projected in each of the positions and the postures using the rotation matrix Ri, the translation vector ti, the reflection position p, and the reflection position q. The identifying means the estimation of an equation for the light beam.

Referring to FIG. 8, a procedure of the calibration in the calibration apparatus 200 is described. FIG. 8 is an example of a flowchart where the calibration apparatus 200 of the first embodiment calibrates the projector 100. Hereinafter, this processing flow is described.

<<S101>>

The projection unit 16 acquires the pattern image read out of the memory unit 32 and projects the pattern light on the plane body 11.

<<S102>>

Next, the image capturing unit 202 captures an image of the pattern light projected on the plane body 11. The image may be captured by the calibrating person, or the image capturing unit 202 may automatically capture the pattern light after detecting the pattern light. The captured image acquiring unit 33 acquires the captured image and causes the memory unit 32 to store the captured image.

<<S103>>

The captured image acquiring unit 33 determines whether the image capturing unit 202 has repeated image captures a predetermined number of times (m times here). Said differently, it is determined whether the M captured images is acquired. Although the M pattern lights remain the same, the position and the posture are changed by the calibrating personal each of the captures of the images. The position and the posture of the projector 100 may be changed by a human work or by a drive device. Meanwhile, even if the position and the posture of the projector 100 are changed, the relative position and the relative posture between the plane body 11 and the image capturing unit 202 are fixed.

<<S104>>

After repeatedly capture the image M times, the process goes to step S104. The reflection position estimating unit 34 estimates the reflection positions p of the light beams from the projector 100 having the different positions or different postures on the plane body. The reflection position p is a two-dimensional coordinate. Therefore, the reflection position estimating unit 34 acquires the coordinate of the reflection position of the light beam in the captured image. In the pattern image (the checker pattern) illustrated in FIG. 9A, the corner of each of the lattices is made the characteristic point, and the coordinate of the characteristic point is acquired. Harris's corner detection method may be used in detecting the coordinate of the characteristic point. Formula (5) explains Harris's corner detection method. In Formula (5), I designates a pixel value at a position x, y of the pixel. In Formula (5), the R designates a detection function for a corner. A pixel position where the detection function equal to or greater than the threshold is acquired corresponds to the corner. In Formula (5), the det designates a determinant of a matrix, and k(trM) designates a trace of the matrix M.

[Formula 4]

$$M = \begin{pmatrix} \left(\frac{\partial I}{\partial x}\right)^2 & \frac{\partial I}{\partial x}\frac{\partial I}{\partial y} \\ \frac{\partial I}{\partial x}\frac{\partial I}{\partial y} & \left(\frac{\partial I}{\partial y}\right)^2 \end{pmatrix} \quad (5)$$

$$R = \det M - k(trM)^2$$

In a case where the checker pattern is used, the reflection positions of all the light beams forming the pattern image are not acquired, and the light beams at portions (including at least corner points) detected as corners are discretely acquired.

Next, referring to FIG. 10, the reflection position of the light beam on the captured image is transformed to the coordinate on the plane body. FIG. 10 illustrates an example of a pattern light projected onto the plane body and the captured image 19. Because the relative position and relative posture between the plane body 11 and the image capturing unit 202 are fixed, the characteristic point on the captured image 19 can be transformed to the coordinate of the characteristic point on the plane body using a projective transformation matrix H for transforming from the coordinate on the captured image 19 to the coordinate on the plane body. The transformation of a characteristic point (u, v) on the captured image to reflection position (x, y) on the plane body is expressed by Formula (6). In Formula (6), an equivalence symbol of Formula (6)-1 means that the left member is equal to a scalar multiple (excluding 0) of the right member.

The coordinate of the characteristic point on the plane body is measured by the calibrating person using the upper left characteristic point as the original point, for example. For example, in a case where a rectangular plane member is used as the plane body 11, four corners of the plane member are used as the characteristic points. In this case, the four characteristic points of the captured image 19 may be the four corners of the plane member whose image is captured. Alternatively, the checker pattern of FIG. 9A or the circle pattern of FIG. 9B is projected onto the plane body by the calibrating person, and the position of the characteristic point on the plane body is measured.

[Formula 5]

$$\begin{pmatrix} x \\ y \\ 1 \end{pmatrix} \cong H \begin{pmatrix} u \\ v \\ 1 \end{pmatrix} \quad (6)$$

$$\cong \quad (6\text{-}1)$$

The projective transformation matrix H is a 3×3 matrix. However, because there is indefiniteness in a scale, the degree of freedom is 8. Already known 4 points (4×2=8 restrictions because the points constitute the two-dimensional coordinate) of the coordinate on the plane body is used to identify elements of the projective transformation matrix H. At first, the projective transformation is described as follows.

[Formula 6]

$$x = \frac{h_1 u + h_2 v + h_3}{h_7 u + h_8 v + 1} \quad (7)$$

$$y = \frac{h_4 u + h_5 v + h_6}{h_7 u + h_8 v + 1},$$

where h1 to h3 are projective transformation parameters. Further, H is represented as follows.

[Formula 7]

$$H = \begin{pmatrix} h_1 & h_2 & h_3 \\ h_4 & h_5 & h_6 \\ h_7 & h_8 & 1 \end{pmatrix} \quad (8)$$

The following is acquired from one corresponding point between the captured image 19 and the image on the plane body.

[Formula 8]

$$\begin{pmatrix} u & v & 1 & 0 & 0 & 0 & -ux & -vx \\ 0 & 0 & 0 & u & v & 1 & -uy & -vy \end{pmatrix} \begin{pmatrix} h_1 \\ h_2 \\ \vdots \\ h_8 \end{pmatrix} = \begin{pmatrix} x \\ y \end{pmatrix} \quad (9)$$

Therefore, if the four corresponding points are acquired, the eight elements of the projective transformation matrix H can be determined. Because the relative position and relative posture between the plane body 11 and the image capturing unit 202 are fixed, it is sufficient to acquire only one projective transformation matrix H.

Hereinafter, a reflection position of the j-th light beam on the plane body in the i-th position among the M positions and postures is designated as Pij. The coordinate system on the plane body is formed by the original point, the x axis, and the y axis on the plane body and the z axis in the direction of the normal line of the plane of the plane body. Said differently, the z coordinate of the reflection position pij is constantly 0, and the x coordinate and the y coordinate are acquired using Formula (6).

<<S105>>

Next, the plane body position and posture estimating unit 35 estimates the relative position of the plane body 11 and the relative posture of the plane body 11 relative to the projector 100. Although the position and the posture of the projector 100 are actually moved in a calibration operation, the relative position and the relative posture of the plane body 11 viewed from the coordinate system of the projector 100 are estimated. Provided that the rotation matrix and the translation vector of the plane body 11 relative to the projector in the i-th position and posture are designated by Ri and ti, respectively, the reflection position qij of the j-th light beam in the i-th position and posture of the projector coordinate system on the plane body is expressed by Formula (10). Formula (10) is an exemplary transformation equation.

[Formula 9]

$$q_{ij} = R_i p_{ij} + t_i \quad (10)$$

Figure 11:
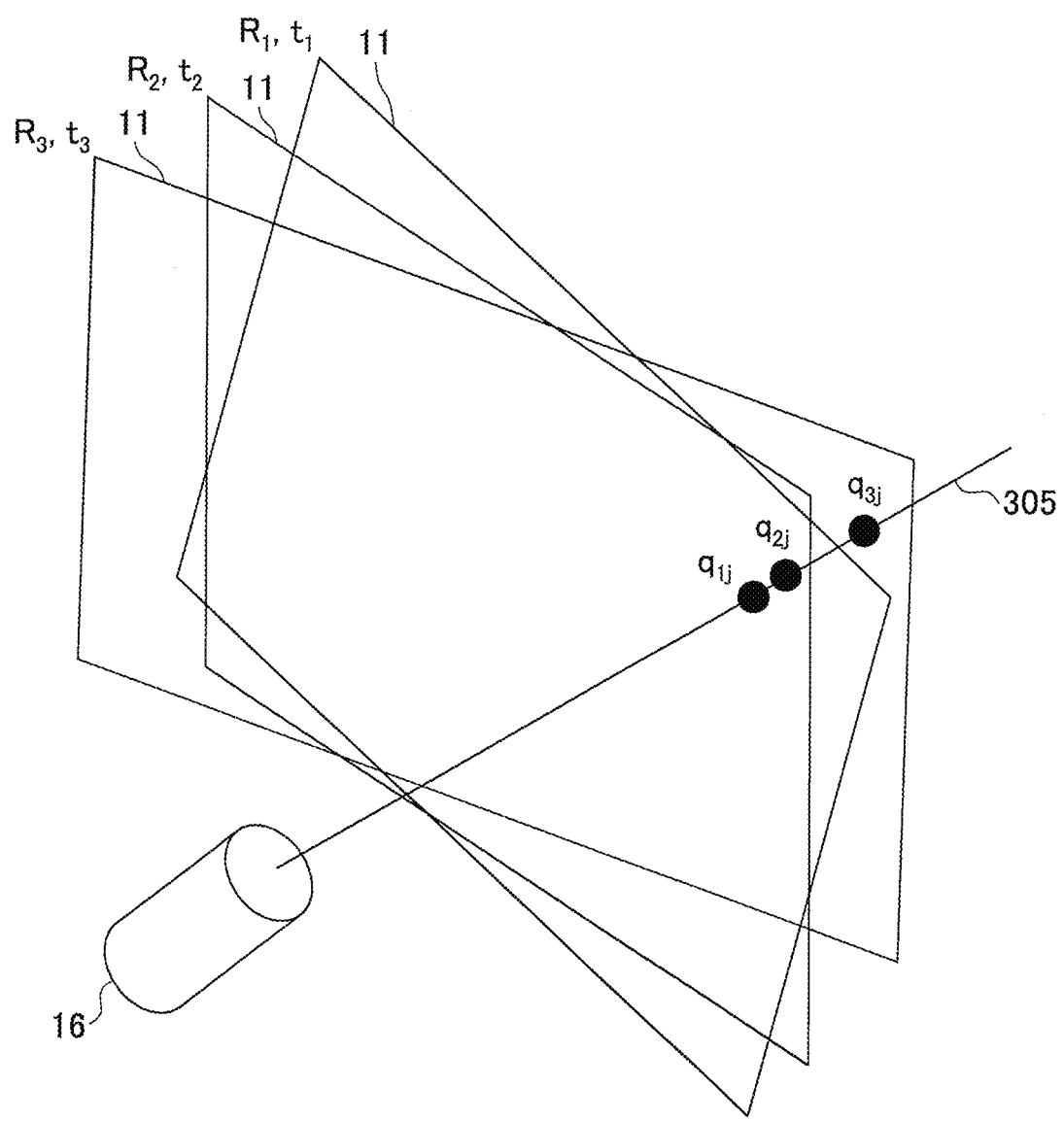
FIG. 11 illustrates an example of a position of a plane body, a posture thereof, and a reflection position qij.

FIG. 11 illustrates an example of the position and the posture of the plane body 11 and the reflection position qij. FIG. 11 illustrate three reflection points q1j, q2j, and q3j, at which the j-th light beam 305 is reflected with respect to three positions and postures of the plane body 11.

Within a medium having the same refractive index, light goes straight. Therefore, a reflection position group {qij|i=1, 2, . . . , M} of the j-th light beam 305 forms a straight line in the three-dimensional space. Said differently, the same light beam can be reflected by the plane body 11 at different positions and postures. Therefore, Ri and ti are acquired so that a degree of misfit from the straight lines of the light beams is minimized. When the degree of misfit from the straight line formed by the reflection position group is designated by D, an evaluation function of an optimization target becomes as follows.

[Formula 10]

$$J(\{R_i, t_i\}_{i=1}^M) = \sum_{j=1}^N D(\{q_{ij}\}_{i=1}^M) \quad (11)$$

The plane body position and posture estimating unit 35 cause the group of the points (q1j, q2j, q3j in FIG. 11) to approximate (fitting) the straight line using a least-square method in order to acquire the straight line. Said differently, an approximation straight line is acquired. A square sum (an error sum of squares for the straight line) of distances between the group of the points (q1j, q2j, q3j in FIG. 11) and the straight line is used as the degree D of misfit. As an idea, Ri and ti are changed with respect to the same i in some ways. The Ri and ti, with which the degree D of misfit is minimized, indicate the position and posture of the plane body.

Specifically, the plane body position and posture estimating unit 35 acquires a covariance matrix for a three-dimensional position of the group of points using Formula (10). Because the sum of eigenvalues of the covariance matrix is a variance of the original matrix, as the sum of the eigenvalues is smaller, the misfit of the group of points from the straight line is estimated to be small. However, the maximum eigenvalue of the covariance matrix corresponds to the variance in the direction of the straight line in a case where the group of points is approximated to the straight line, it is preferable to omit the maximum eigenvalue of the covariance matrix from the above sum. Therefore, the sum of the eigenvalues except for the maximum eigenvalue of the covariance matrix of the three-dimensional positions of the group of points calculated using Formula (10) may be the degree D of misfit.

The Ri and ti corresponding to the minimum evaluation function (the degree D of misfit) are acquired by using a non-linear programming method such as a steepest descent method, a Newton method, or a conjugate gradient method as the degree D of misfit while using an arbitrary element (an element of a matrix) as a variable number. For example, in the steepest descent method, the degree D of misfit is repeatedly updated using a value acquired by multiplying a partial differential value of the elements Ri or ti of the degree D of misfit by a predetermined value. The position and the posture of the plane body are indicated by Ri and ti when a variation of the degree D of misfit becomes substantially small.

<<S106>>

Next, the projection light identifying unit 36 identifies an equation of each of the light beams of the projector. Specifically, because Ri and ti are acquired, qij is acquired by calculating Formula (10). Then, the straight line (the equation) of the light beam passing through the reflection position group {qij|i=1, 2, . . . , M} is identified by causing the reflection position group {qij|i=1, 2, . . . , M} of the j-th light beam (by fixing j) to approximate using the least-square method.

As described above, within this embodiment, the presumption as being the pinhole optical system where light converges into one point is not adopted for the light beam group of the projector 100 is not used. The equation of the light beam is acquired using a straightly running property of the light as evaluation standards. Therefore, it is possible to generally apply the calibration apparatus and the calibration method of the first embodiment to a non-pinhole optical system.

The pattern image is not limited to the pattern image illustrated in FIGS. 9A and 9B, and may be the pattern image whose contrasting changes in a sine wave form as illustrated in FIG. 12. In a case where the pattern image illustrated in FIG. 12 is used, in step S104 of FIG. 8, the image capturing unit 202 captures multiple images while the calibrating person or the like moves the pattern light so as to rightward and leftward shift with the projector 100 maintained to be at the same position and the same posture. Because a contrasting density is distributed in the sine wave form in the rightward and leftward directions, a sine wave whose phase is shifted in the rightward and leftward directions is acquired. When the sine wave is acquired, it is possible to specify all continuous phases between 0 to 359 degrees.

The pattern light illustrated in FIG. 12 is turned by 90 degrees and the turned pattern light is similarly projected in the upward and downward directions. The image capturing unit 202 captures multiple images while the calibrating person or the like moves the pattern light so as to upward and downward shift. Then, the phase is specified in the upward and downward directions. Thus, all pixel positions of the captured image correspond to the positions on the plane body 11. Then, all the pixel positions of the captured image may be used as the position of the characteristic point in the first embodiment (this extraction of the characteristic points is called a phase shift method).

Second Embodiment

Within a second embodiment, described is a calibration method where the calibrating person or the like performs a calibration by moving the plane body 11 relative to the fixed projector 100 and the fixed image capturing unit 202. This calibration is preferably applicable to a case where the image capturing unit 202 is secured to the projector 100 as illustrated in the projector and camera system 500 illustrated in FIG. 4.

Because a constructional element having the same reference symbol performs similar function, an explanation of a constructional element once explained may be omitted or only a different point may be described. The function block chart of the calibration apparatus 200 of the second embodiment may be similar to the function block chart of the first embodiment illustrated in FIG. 7. However, the reflection position estimating unit 34 of the second embodiment has a function different from the first embodiment at a point where a projective transformation matrix Hi corresponding to the position and posture of the i-th plane body 11 is estimated in addition to the estimation of the one projective transformation matrix H.

The flowchart illustrating the calibration method by the calibration apparatus 200 is similar to FIG. 8 of the first embodiment. However, the operation of step S104 differs from the operation of the first embodiment. Hereinafter, a detailed description of the step S104 is given.

<<S104>>

The reflection position estimating unit 34 estimates the reflection position of the light beam of the projector 100 relative to the plane body 11 whose position and posture are changed by the calibrating person or the drive device. It is different from the first embodiment in that the relative position and the relative posture between the image capturing unit 202 and the plane body 11 are changed. Therefore, the reflection position on the plane body is not acquired using the determined one projective transformation matrix H.

Characteristic points equal to four or greater of a known coordinate on the plane body are extracted from the captured image. The reflection position estimating unit 34 estimates the projective transformation matrix Hi corresponding to the position and posture of the i-th plane body 11 from a relationship between extracted positions on the captured image and the coordinate on the plane body. Said differently, the projective transformation matrix Hi is estimated for each of the positions and postures of the i-th plane body 11. In a manner similar to the first embodiment, in a case where a rectangular plane member is used as the plane body 11, four corners of the plane member are used as the characteristic points. In this case, the four characteristic points of the captured image may be the four corners of the plane member whose image is captured. Alternatively, the checker pattern of FIG. 9A or the circle pattern of FIG. 9B is projected onto the plane body by the calibrating person, the calibration apparatus 200 may extract a characteristic point of the captured image corresponding to the characteristic point of the plane member.

If the projective transformation matrix Hi corresponding to the position and posture of the i-th plane body 11 is estimated as described above, it is possible to transform from a characteristic point (u, v) on the captured image to a reflection position (x, y) on the plane body using the following formula. Processes on or after the above processes are similar to those of the first embodiment.

[Formula 11]

$$\begin{pmatrix} x \\ y \\ 1 \end{pmatrix} \cong H_i \begin{pmatrix} u \\ v \\ 1 \end{pmatrix} \quad (12)$$

Within the second embodiment, the plane body 11 is moved while the projector 100 and the image capturing unit 202 are fixed, it is possible to preferably calibrate the projector 100 having a hardware structure where the projector 100 and the image capturing unit 202 are integrated.

Third Embodiment

Within a third embodiment, in a case where a previous value of the position and posture of the plane body 11 relative to the projector 100 is acquired, the calibration apparatus 200 calibrates the projector 100 with a high accuracy using the previous value. This calibration apparatus 200 is described. The previous value is acquired when the calibrating person measures the position and posture of the plane body 11 using, for example, a measure, and by using an adjustment value of an operation jig which controls the position and posture of the plane body 11.

A functional block chart of the calibration apparatus 200 of the second embodiment may be similar to FIG. 7 of the first embodiment. The plane body position and posture estimating unit 35 calculates the i-th position and posture of the projector 100 using the previous value of the position and posture.

The flowchart illustrating the calibration method by the calibration apparatus 200 is similar to FIG. 8 of the first embodiment. However, the operation of step S105 differs from the operation of the first embodiment. Hereinafter, a detailed description of the step S105 is given.

<<S105>>

The plane body position and posture estimating unit 35 estimates the relative position of the plane body 11 and the relative posture of the plane body 11 relative to the projector 100. As described, a previous value (a previous posture) of a rotation matrix of the plane body 11 relative to the projector 100 in the i-th position and posture is represented by R'i, and a previous value (a previous posture) of a translation vector of the plane body 11 relative to the projector 100 in the i-th position and posture is represented by t'i. At this time, a new evaluation function J' is set as follows by adding a regularization term φ to the evaluation function of Formula (11) as follows.

[Formula 12]

$$J'(\{R_i, t_i\}_{i=1}^M) = \sum_{j=1}^N D(\{q_{ij}\}_{i=1}^M) + \Phi(\{R_i, t_i\}_{i=1}^M) \quad (13)$$

The regularization term becomes greater as Ri and ti are apart more from R'i and t'i, respectively. For example, it is possible to use a norm of a difference from the previous value as in the following formula. For example, a Frobenius norm is used for the rotation matrix Ri, and a L2 norm is used for translation vector ti. Frobenius norm is a square root of a square sum of matrix elements. L2 norm is a square root of a square sum of vector elements.

[Formula 13]

$$\Phi(\{R_i, t_i\}_{i=1}^{M}) = \lambda \sum_{i=1}^{M} \{\|R_i - R'_i\|_F^2 + \alpha \|t_i - t'_i\|_2^2\} \quad (14)$$

Here, $\lambda$ is a parameter adjusting an influence of the regularization term. The calibrating person or the like sets it in response to a reliablility of the previous value. The parameter $\lambda$ is increased in a case where a degree of reliablility of the previous value is high. Further, a is provided to adjust a scale of the rotation matrix and the translation vector.

The evaluation function J' is set using Formula 13 and Formula 14, and a non-linear programming method such as a steepest descent method, a Newton method, and a conjugate gradient method is used to minimize the evaluation function J' and acquire a calculation object, namely Ri and ti.

According to Formula (14), in a case where a misfit from the previous value R'i of the rotation matrix or a misfit from the previous value t'i of the translation vector is small, the evaluation function J' takes the minimum value. Therefore, the rotation matrix Ri and the translation vector ti, which have the smallest misfits from the previous values are calculated by using the previous value R'i of the rotation matrix and the previous value t'i of the translation vector.

In the evaluation function of the first embodiment, there is a case where an accurate rotation matrix Ri or an accurate translation vector ti is not necessarily acquired. However, within the third embodiment, the rotation matrix Ri and the translation vector ti are highly accurately calculated.

Within the third embodiment, an estimation accuracy is enhanced by using the previous value in estimating the relative position and relative posture of the plane body 11 relative to the projector 100. With this, a final calibration accuracy of the projector 100 is enhanced.

Fourth Embodiment

Within a fourth embodiment, described is a calibration method for enhancing the calibration accuracy by providing a smoothing process to the estimated values of the multiple light beams.

Figure 13:
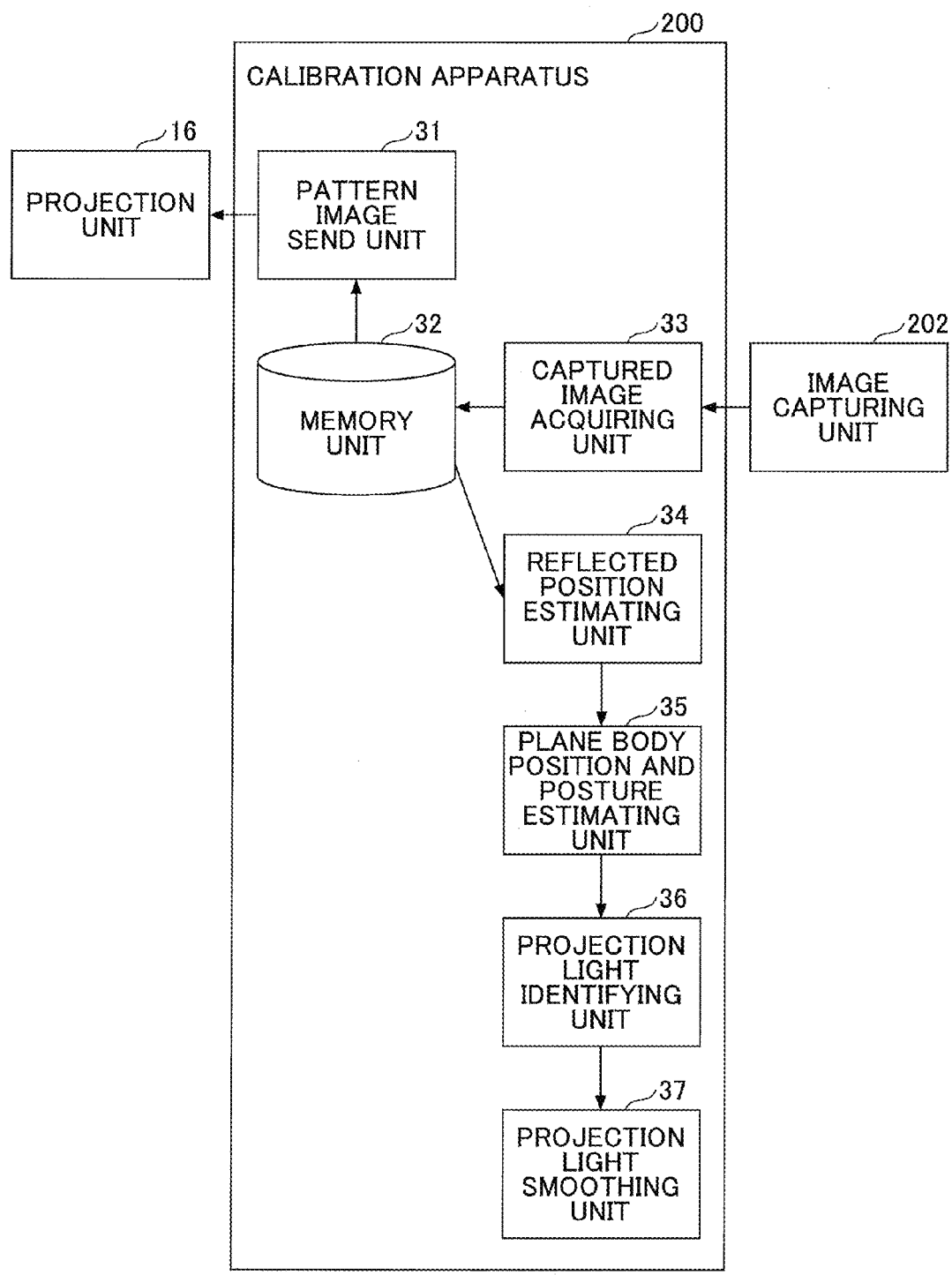
FIG. 13 is a functional block chart of an exemplary calibration apparatus (Fourth Embodiment).

FIG. 13 is a functional block chart of an exemplary calibration apparatus 200. A projection light smoothing unit 37 is added to the functional block chart of FIG. 7. The projection light smoothing unit 37 smoothes the light beam acquired by the projection light identifying unit 36.

FIG. 14 is a flowchart of an exemplary calibration method performed by the calibration apparatus 200. Step S107 is added to the flowchart of FIG. 8. Hereinafter, a detailed description of the step S107 is given.

<<S107>>

The projection light smoothing unit 37 smoothes the light beam acquired by the projection light identifying unit 36. The smoothing method is, for example, a filter process. On the plane body 11, specified characteristic points are arranged like a square lattice in acquiring the projection light beam. A direction cosine e(f,g) of and a passing position a(f,g) of projection light corresponding to characteristic points of f-rows and g-columns are previously acquired. The direction cosine is elements of X, Y, and Z of a vector (a direction vector) representing the travelling direction of the light beam (a projector coordinate system). The passing position a(f, g) may be the reflection position q, which is the three-dimensional coordinate in the projector coordinate system acquired from Formula (10).

An error can be reduced by a smoothing effect when a linear filter illustrated, for example, FIG. 15 is applied to these. FIG. 15 illustrates an example of linear filter.

Specifically, the linear filter is applied as follow. A trajectory m(s) of the light beam in the three-dimensional space is expressed as follows using a variable number.

[Formula 14]

$$m(s) = e(f,g) \times s + a(f,g) \quad (15)$$

Provided that a filter coefficient of the linear filter is w(u,v), a filter output value of the direction cosine and the passing position is acquired. The w(u,v) means the number of rows of the linear filter is u and the number of columns of the linear filter is v.

[Formula 15]

$$\overline{e}(f, g) = \sum_{u} \sum_{v} w(u, v) e(f + u, g + v) \quad (16)$$

$$\overline{m}(f, g) = \sum_{u} \sum_{v} w(u, v) m(f + u, g + v)$$

It is preferable that the output value of the direction cosine is normalized so that the L2 norm becomes 1 after the filter process. The equation of the smoothed light beam is acquired by applying the output values of the direction cosine and the passing position acquired using Formula (16) to Formula (15).

Further, the applied filter is not limited to the linear filter, and may be a non-linear filter such as a median filter, a $\epsilon$ filter, and a bilateral filter. With this, it is possible to smooth the light beam while maintaining an abrupt change.

Within the fourth embodiment, the smoothing process is provided to the estimation value of the multiple light beams to reduce an error in the direction cosine and the passing position. Therefore, an accuracy of the equation of the light beam can be enhanced.

As described above, it is possible to provide the calibration apparatus which can appropriately calibrate an optical system of a non-pinhole model.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although a calibration apparatus has been described in detail, it should be understood that various changes, substitutions, and alterations could be made thereto without departing from the spirit and scope of the invention.

This application is based upon and claims the benefit of priority of the prior Japanese Patent Application No. 2014-

235010, filed on Nov. 19, 2014, the entire contents of which are incorporated herein by reference.

What is claimed is:

1. A calibration apparatus for calibrating a projection apparatus projecting a projection image, the calibration apparatus comprising:
   a captured image acquiring unit configured to acquire a captured image which is generated by capturing a projection image by an image capturing unit at each change of at least one of a relative position between the projection apparatus and a plane body and a relative posture between the projection apparatus and the plane body, the projection image being projected onto the plan body;
   a reflection position estimating unit configured to acquire a plurality of reflection positions, at which a plurality of light beams are reflected on the plane body, at each change of at least one of a position of the plane body and a posture of the plane body using a predetermined correspondence relationship between a pixel of the captured image and a position on the plane body;
   a plane body position posture estimating unit configured to estimate a plurality of positions and postures of the plane body so as to minimize a degree of misfit of the plurality of reflection positions, at which one light beam is reflected on the plane body at each change of at least one of the position of the plane body and the posture of the plane body, from a straight line of the plurality of reflection positions; and
   a projection light beam identifying unit configured to identify an equation of the light beam by transforming the plurality of reflection positions of the light beam into a plurality of coordinates in a three-dimensional space using the position of and the posture of the plane body reflecting the one light beam and by causing the plurality of coordinates to approximate the straight line.

2. The calibration apparatus according to claim 1, wherein the plane body position posture estimating unit
   transforms the plurality of reflection positions of the one light beam into the plurality of coordinates using a transformation equation, which transforms the plurality of reflection positions of the one light beam into the plurality of coordinates using the position and the posture of the plane body,
   acquires an approximation straight line of the plurality of coordinates,
   determines an error sum of squares of the plurality of coordinates relative to the approximation straight line as the degree of misfit, and
   estimates the position and the posture used for the transformation equation at a time when the degree of misfit is the minimum as the position and the posture of the plane body.

3. The calibration apparatus according to claim 2, wherein, in a case where the plurality of reflection positions $p_i$ are transformed into the plurality of coordinates $q_i$ in the three-dimensional space by Formula (17):

$$q_i = R_i p_i + t_i \tag{17}$$

as a transformation equation where a rotation matrix of the plane body relative to the projection apparatus in an i-th position and posture of the plane body, the reflection position estimating unit acquires a covariance matrix which expresses the plurality of coordinates of the reflected one light beam and estimates the rotation matrix $R_i$ and the translation vector $t_i$ respectively as the position and the posture of the plane body, when an evaluation function which is a sum of eigenvalues of the covariance matrix except for a maximum eigenvalue is minimized.

4. The calibration apparatus according to claim 3, wherein the plane body position posture estimating unit adds a difference between a previous position of the plane body and a position to be calculated and a difference between a previous posture of the plane body and a posture to be calculated to the evaluation function, and estimates the rotation matrix $R_i$ and the translation vector $t_i$ at a time when the evaluation function is minimized as the position and the posture of the plane body.

5. The calibration apparatus according to claim 1, wherein, in a case where the image capturing unit captures an image of the plane body, onto which the projection image is projected, at each change of the at least one of the position of the projection apparatus and the posture of the projection apparatus while fixing the relative position between the image capturing unit and the plane body, the reflection position estimating unit acquires the reflection position of the light beam on the plane body using a projective transformation matrix predetermined as the correspondence relationship when the at least one of the position and the posture of the plane body is changed.

6. The calibration apparatus according to claim 1, wherein, in a case where the image capturing unit captures an image of the plane body, onto which the projection image is projected, at each change of the at least one of the position of the projection apparatus and the posture of the projection apparatus while fixing the relative position between the image capturing unit and the plane body, the reflection position estimating unit calculates a projective transformation matrix as the correspondence relationship at each change of the position or the posture of the plane body, and acquires the reflection position of the light beam on the plane body using the calculated projective transformation matrix when the at least one of the position and the posture of the plane body is changed.

7. The calibration apparatus according to claim 1, further comprising:
   wherein a projection light smoothing unit configured to provide the equation of the light beam identified by the projection light beam identifying unit with a smoothing process.

8. A calibration method performed by a calibration apparatus for calibrating a projection apparatus projecting a projection image, the calibration method comprising:
   acquiring a captured image which is generated by capturing a projection image by an image capturing unit at each change of at least one of a relative position between the projection apparatus and a plane body and a relative posture between the projection apparatus and the plane body, the projection image being projected onto the plan body;
   acquiring a plurality of reflection positions, at which a plurality of light beams are reflected on the plane body, at each change of at least one of a position of the plane body and a posture of the plane body using a predetermined correspondence relationship between a pixel of the captured image and a position on the plane body;
   estimating a plurality of positions and postures of the plane body so as to minimize a degree of misfit of the plurality of reflection positions, at which one light beam is reflected on the plane body at each change of at least one of the position of the plane body and the posture of the plane body, from a straight line of the plurality of reflection positions; and identifying an equation of the light beam by transforming the plurality of reflection positions of the light beam into a plurality of coordinates in a three-dimensional space using the position of and the posture of the plane body reflecting the one light beam and by causing the plurality of coordinates to approximate the straight line.

9. A non-transitory computer-readable storage medium storing a program for causing a computer to execute a calibration method performed by a calibration apparatus for calibrating a projection apparatus projecting a projection image, the calibration method comprising:

acquiring a captured image which is generated by capturing a projection image by an image capturing unit at each change of at least one of a relative position between the projection apparatus and a plane body and a relative posture between the projection apparatus and the plane body, the projection image being projected onto the plan body;

acquiring a plurality of reflection positions, at which a plurality of light beams are reflected on the plane body, at each change of at least one of a position of the plane body and a posture of the plane body using a predetermined correspondence relationship between a pixel of the captured image and a position on the plane body;

estimating a plurality of positions and postures of the plane body so as to minimize a degree of misfit of the plurality of reflection positions, at which one light beam is reflected on the plane body at each change of at least one of the position of the plane body and the posture of the plane body, from a straight line of the plurality of reflection positions; and identifying an equation of the light beam by transforming the plurality of reflection positions of the light beam into a plurality of coordinates in a three-dimensional space using the position of and the posture of the plane body reflecting the one light beam and by causing the plurality of coordinates to approximate the straight line.

\* \* \* \* \*